US011582220B2

(12) United States Patent
Ito

(10) Patent No.: US 11,582,220 B2
(45) Date of Patent: Feb. 14, 2023

(54) AUTHENTICATION SERVER AND METHOD THAT ALLOW USER TO LOG INTO APPLICATION OR SERVICE PROVIDED VIA CLIENT DEVICES

(71) Applicant: Konica Minolta Business Solutions U.S.A., Inc., San Mateo, CA (US)

(72) Inventor: Hiroyasu Ito, Foster City, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 190 days.

(21) Appl. No.: 16/836,179

(22) Filed: Mar. 31, 2020

(65) Prior Publication Data

US 2021/0306324 A1     Sep. 30, 2021

(51) Int. Cl.
*H04L 29/06* (2006.01)
*H04L 9/40* (2022.01)
*H04W 12/06* (2021.01)

(52) U.S. Cl.
CPC ........ *H04L 63/0815* (2013.01); *H04L 63/083* (2013.01); *H04L 63/0823* (2013.01); *H04L 63/0884* (2013.01); *H04L 63/10* (2013.01); *H04W 12/06* (2013.01)

(58) Field of Classification Search
CPC ............. H04L 63/0815; H04L 63/0823; H04L 63/083; H04L 63/0884; H04L 63/10; H04W 12/06
See application file for complete search history.

(56) References Cited

U.S. PATENT DOCUMENTS

| 6,993,658 | B1* | 1/2006 | Engberg | ............... H04L 63/0853 709/219 |
| 2005/0210253 | A1* | 9/2005 | Shigeeda | ............... H04L 9/3271 713/169 |
| 2007/0194884 | A1* | 8/2007 | Didier | .................... G06V 40/10 340/5.82 |

(Continued)

OTHER PUBLICATIONS

David Bauer et al., Minimal Information Disclosure with Efficiently Verifiable Credentials, Oct. 2008, ACM, pp. 15-24. (Year: 2008).*

(Continued)

*Primary Examiner* — Luu T Pham
*Assistant Examiner* — Fahimeh Mohammadi
(74) *Attorney, Agent, or Firm* — Osha Bergman Watanabe & Burton LLP

(57) ABSTRACT

An authentication server is connected to a plurality of client devices via a network and includes: a storage that stores a database including: a plurality of pieces of user information; and multiple kinds of a plurality of pieces of credential information for logging into an application or service provided by an external server via each of the client devices; and a processor that: upon receiving a first piece of user information from a first client device, determines whether the database contains a first piece of credential information corresponding to the first piece of user information, and upon determining that the database contains the first piece of credential information, sends to the first client device the first piece of credential information required to allow a user to log into the application or service provided via the first client device.

13 Claims, 9 Drawing Sheets

(56) References Cited

U.S. PATENT DOCUMENTS

| | | | | |
|---|---|---|---|---|
| 2009/0293135 | A1* | 11/2009 | Nanaumi | G06F 21/6218 726/28 |
| 2009/0320107 | A1* | 12/2009 | Corella | G06F 21/31 726/6 |
| 2012/0042363 | A1* | 2/2012 | Moosavi | H04W 12/06 726/5 |
| 2012/0293819 | A1* | 11/2012 | Doui | H04L 63/083 358/1.13 |
| 2015/0312242 | A1* | 10/2015 | Ogawa | G06F 16/955 726/6 |
| 2015/0352905 | A1* | 12/2015 | Tanaka | B60C 11/125 152/209.18 |
| 2017/0118202 | A1* | 4/2017 | Mathew | H04L 63/0869 |
| 2017/0193723 | A1* | 7/2017 | Park | E05B 49/00 |
| 2017/0364875 | A1* | 12/2017 | Efroni | G06F 21/31 |
| 2018/0288006 | A1* | 10/2018 | Somasandharam | H04L 9/3234 |
| 2018/0324159 | A1* | 11/2018 | Koya | H04L 63/10 |
| 2019/0306143 | A1* | 10/2019 | Hamel | G06F 21/31 |
| 2021/0019434 | A1* | 1/2021 | Bibliowicz | G06F 16/90335 |
| 2021/0067506 | A1* | 3/2021 | Ideguchi | H04L 67/568 |
| 2021/0234677 | A1* | 7/2021 | Isenhour | H04L 63/0861 |

OTHER PUBLICATIONS

Laura Pearlman et al., A Community Authorization Service for Group Collaboration, Aug. 7, 2002, IEEE, pp. 1-10. (Year: 2002).*

Mohammad Wazid et al., Design of Secure User Authenticated Key Management Protocol for Generic IoT Networks, Feb. 2018, IEEE, vol. 5, Issue: 1, pp. 269-282. (Year: 2018).*

Md. Zulfiker Ali et al., A Single Sign On Mechanism for Multiple Grid Manager on Alchemi .NET Based Grid Framework, May 2, 2013, IEEE, pp. 436-440. (Year: 2013).*

* cited by examiner

FIG. 5

| ID | USER PROPERTY | | | | | ACCOUNT STATUS | | CREDENTIAL INFORMATION | | | | | | | USER INFORMATION | | |
|---|---|---|---|---|---|---|---|---|---|---|---|---|---|---|---|---|---|
| | | | | | | | | AD | | EXT APP1 | | EXT APP2 | | VIRTUAL CARD ID | BIO AUTHENTICATOR | | 2ND AUTHENTICATOR |
| AUTH ID | NAME | EMAIL | division | location | role | VALIDITY | EXPIRATION DATE | AD USER NAME | AD PW | EXT APP ID | EXT APP PW | EXT APP ID | EXT APP PW | ID | fin template | Face template | PIN |
| 1 | Abc Defgh | user1@konimino.com | HR | Tokyo | Manager | Yes | 2019/9/30 | Miko | 1234 | Miko1 | 1234 | MM12 | 5678 | 1327543978 | x | x | 3543 |
| 2 | Bcd Efgh | user1@konimino.com | ITSupport | Tokyo | IT admin | Yes | 2019/9/30 | Hiro | 5678 | Hiro2 | 5678 | HI34 | 9012 | 8473795972 | x | | 4563 |
| 3 | Cde Fghij | user1@konimino.com | ITSupport | Nagoya | IT admin | Yes | 2020/12/28 | Subra | 9012 | Subra3 | 9012 | SB44 | 3456 | 9388872454 | x | x | 5792 |
| 4 | Def Ghijk | user1@konimino.com | Accounting | Nagoya | Standard user | No | 2020/12/28 | Marc | 3456 | Marc4 | 3456 | MC45 | 1234 | 1429202052 | | | 1549 |
| 5 | Efg Hijk | user1@konimino.com | R&D | Osaka | Standard user | Yes | 2019/9/30 | Taka | taiowe | Taka2 | jinste | TK14 | m3l | 9872947l011 | | x | 2645 |
| 6 | ... | | | | | | | | | | | | | | | | |
| 7 | ... | | | | | | | | | | | | | | | | |
| 8 | ... | | | | | | | | | | | | | | | | |
| 9 | | | | | | | | | | | | | | | | | |
| 10 | | | | | | | | | | | | | | | | | |
| 11 | | | | | | | | | | | | | | | | | |
| 12 | | | | | | | | | | | | | | | | | |
| 13 | | | | | | | | | | | | | | | | | |
| 14 | | | | | | | | | | | | | | | | | |

AUTHENTICATION SERVER AND METHOD THAT ALLOW USER TO LOG INTO APPLICATION OR SERVICE PROVIDED VIA CLIENT DEVICES

BACKGROUND

Technical Field

The present invention generally relates to an authentication server and method that allow users to log into applications/services provided by external servers via client devices.

Description of Related Art

Integrated security services authenticate and manage multiple devices on a network. With such services, users can integrally manage various devices such as security doors, multi-function peripherals (MFPs), cellular phones, and personal computers (PCs) on a single network. Users can also integrally manage various services on the network, such as cloud services, using those devices.

When utilizing multiple devices managed by different authentication services, the users must individually log into applications/services provided via the devices using different credential information. The respective authentication services cannot be changed or updated without taking downtime of the devices for maintenance.

For the above reasons, some users carry multiple kinds of authentication devices such as ID cards, cellphones, wristbands, etc., each of which stores different credential information to log into the applications/services provided via the devices managed by different authentication services.

SUMMARY

One or more embodiments of the invention provide an authentication server and method that simplify authentication processing in each of multiple client devices managed by different authentication services, without adding substantial changes to existing systems.

One or more embodiments provide an authentication server connected to a plurality of client devices via a network, the authentication server including: a storage that stores a database including: a plurality of pieces of user information; and multiple kinds of a plurality of pieces of credential information for logging into an application or service provided by an external server via each of the client devices; and a processor that: upon receiving a first piece of user information from a first client device, determines whether the database contains a first piece of credential information corresponding to the first piece of user information, and upon determining that the database contains the first piece of credential information, sends to the first client device the first piece of credential information required to allow a user to log into the application or service provided via the first client device.

One or more embodiments provide an authentication method using an authentication server that is connected to a plurality of client devices via a network, and includes a storage and a processor, the method including: storing, in the storage, a database including: a plurality of pieces of user information; and multiple kinds of a plurality of pieces of credential information for logging into an application or service provided by an external server via each of the client devices; and upon the processor receiving a first piece of user information from a first client device, determining, by the processor, whether the database contains a first piece of credential information corresponding to the first piece of user information, and upon the processor determining that the database contains the first piece of credential information, sending, by the processor to the first client device, the first piece of credential information required to allow a user to log into the application or service provided via the first client device.

One or more embodiments provide an non-transitory computer readable medium (CRM) storing computer readable program code that is executed by a computer as an authentication server being connected to a plurality of client devices and including a storage and a processor, and causes the computer to execute: storing, in the storage, a database including: a plurality of pieces of user information; and multiple kinds of a plurality of pieces of credential information for logging into an application or service provided by an external server via each of the client devices; upon the processor receiving a first piece of user information from a first client device, determining, by the processor, whether the database contains a first piece of credential information corresponding to the first piece of user information; and upon the processor determining that the database contains the first piece of credential information, sending, by the processor to the first client device, the first piece of credential information required to allow a user to log into the application or service provided via the first client device.

BRIEF DESCRIPTION OF THE DRAWINGS

FIG. 5 is a table showing a database stored in the authentication server according to one or more embodiments.

DETAILED DESCRIPTION

Figure 1:
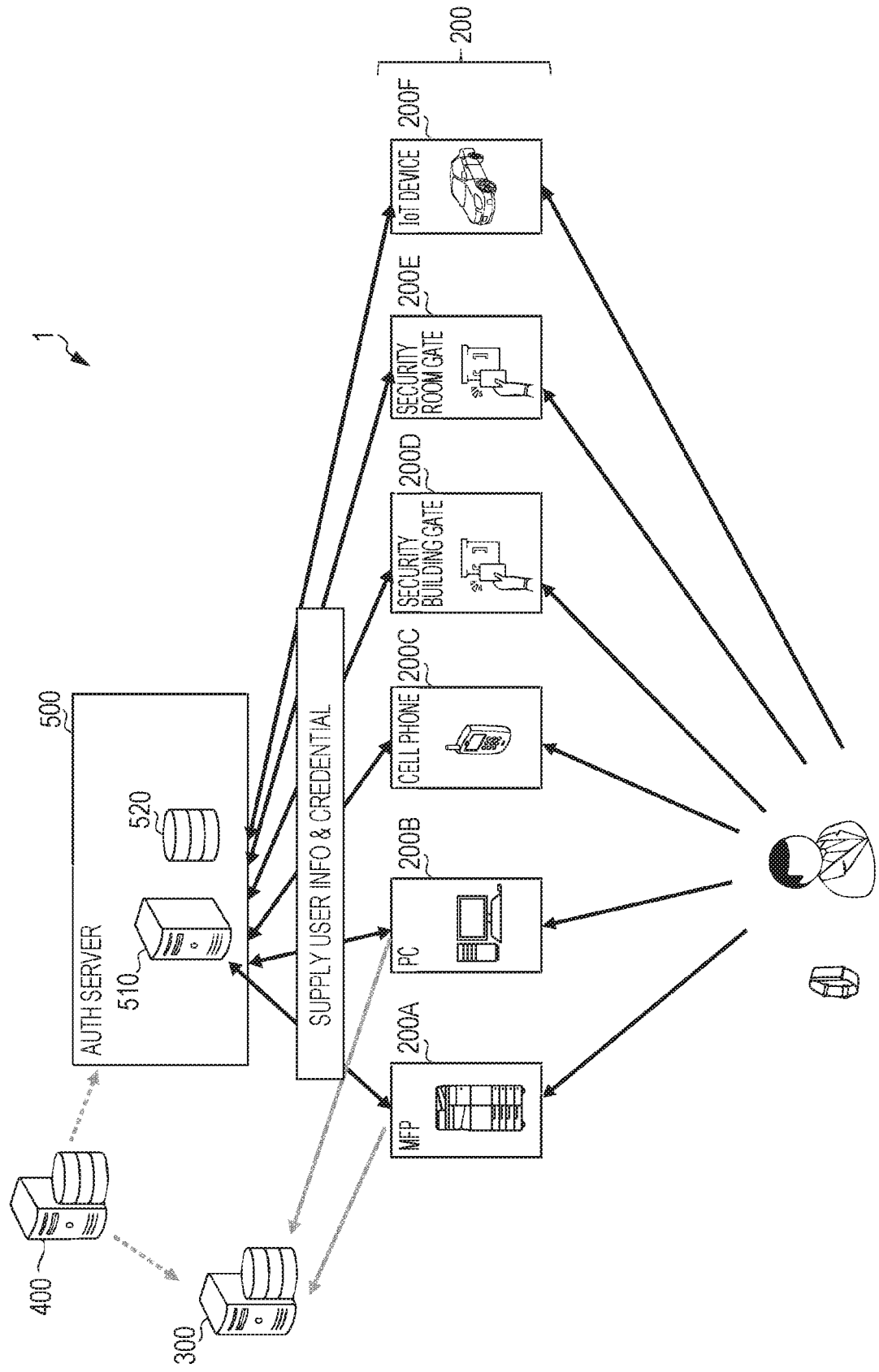
FIG. 1 is a schematic view of an authentication system according to one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

[Existing Systems]

Figure 10:
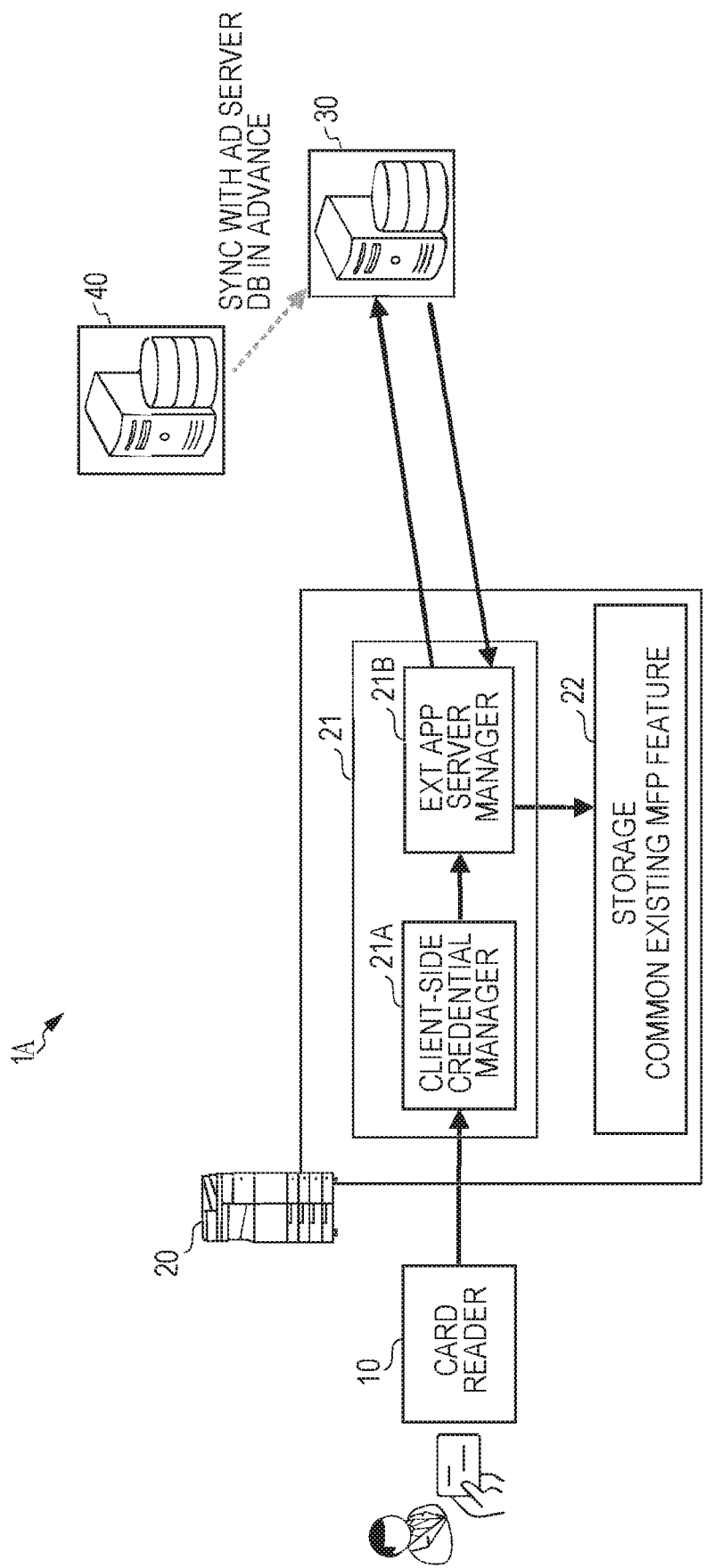
FIG. 10 shows a schematic view of an existing on-premises system.

FIG. 10 shows a schematic view of an existing on-premises system 1A used for example in a corporate workplace. The system 1A comprises: a card reader 10; a Multifunction Peripheral (MFP) 20; an external application server (or external server) 30; and an active directory (AD) server 40, which are connected one another via a network. The MFP 20 comprises a processor 21 and a storage 22. The processor 21 functions as a client-side credential manager 21A and an external application server manager 21B.

When a user touches the card reader 10 with a card, the card reader 10 reads a card ID from the card, and sends the same to the MFP 20. In the MFP 20, the client-side credential manager 21A notifies the external application server manager 21B of the card ID, and the external application server manager 21B sends the card ID to the external application server 30.

The external application server 30 manages a document workflow of the MFP 20. The external application server 30 is synchronized with the AD server 40, and stores user information and credential information that includes card IDs. When determining that the card ID matches a stored card ID, the external application server 30 informs the external application server manager 21B of successful authentication.

Upon successful authentication, the client-side credential manager 21A allows the user to log into applications/services provided via the MFP 20, and the user can operate the MFP 20 to, for example, switch screens on a display, and to pull document data from the external application server 30.

Other examples of the existing systems may include cloud services of workflow systems and security systems that utilize HID® cards. These existing systems adopt different authentication services, and users must individually log into applications/services provided via multiple devices of the systems using different pieces of credential information. For this reason, some users carry multiple kinds of authentication devices such as ID cards, cellphones, wristbands, etc., which store the different pieces of credential information, respectively.

[Authentication System]

One or more embodiments of the invention provide an authentication server and method that simplify authentication processing in each of multiple client devices managed by different authentication services, without adding substantial changes to the existing systems.

FIG. 1 is a schematic view of an authentication system 1 according to one or more embodiments of the invention. The authentication system 1 comprises a plurality of client devices 200, an external application server (or external server) 300, an active directory (AD) server 400, and an authentication server 500, which are connected to a network (e.g., a local area network (LAN), a wide area network (WAN) such as the Internet, a mobile network, or any other type of network) via a network interface connection (not shown). Although not illustrated in FIG. 1, one or more additional external application servers may be connected to the network.

The authentication server 500 stores a database comprising multiple kinds of a plurality of pieces of credential information for logging into applications/services provided by one or more of the external application servers (e.g., the external application server 300) via each of the client devices 200 connected to the authentication server 500. Each piece of credential information identifies a specific user. In one or more embodiments, each piece of credential information indicates the applications/services provided by a specific server (e.g., the external application server 300) among the external application servers. The multiple kinds of the plurality of pieces of credential information may include a user name, a password, a user ID, a card ID, biological information of the user, certificate information, and pseudo credential information. The certificate information indicates that the user is authenticated by a proper server (e.g., the authentication server 500). The pseudo credential information is virtual credential information that enables the user to log into a desired application or service provided by the external application servers via the one of the client devices 200. In one or more embodiments, the piece of pseudo credential information is a combination of alphanumeric characters uniquely set by authentication server 500.

The authentication server 500 also stores a plurality of pieces of user information. Each piece of user information identifies a specific user. The plurality of pieces of user information for each user may include a password, an user ID, biological information of the user, a PIN number, a card ID, and a device ID owned by the user, in one or more embodiments.

Upon receiving a piece of user information from one of the client devices 200 (e.g., MFP 200A), the authentication server 500 sends to the one of the client devices 200 the one or more pieces of credential information required to allow the user to log into the applications/services provided via the one of the client devices 200. If a database described later does not contain the corresponding credential information, the authentication server 500 creates a piece of pseudo credential information and sends to the one of the client devices 200 the piece of pseudo credential information required to allow the user to log into the applications/services.

Upon receiving the corresponding credential information or the pseudo credential information from the authentication server 500, the one of the client devices 200 sends an authentication request, with the corresponding credential information or the pseudo credential information, to the external application server 300. The external application server 300 performs authentication using the corresponding credential information or the pseudo credential information, and notifies authentication results to the one of the client devices 200. Upon successful authentication, the one of the client devices 200 allows a user to log into the applications/services provided via the one of the client devices 200, and the one of the client devices 200 can be operated according to workflows and/or applications managed by the external application server 300.

By the similar processing, the user can log into the applications/services provided via another of the client devices 200 (e.g., personal computer (PC) 200B, cell phone 200C, security building gate 200D, security room gate 200E, or Internet of Things (IoT) device 200F) managed by the same authentication server 500. For this reason, the user does not need to carry multiple kinds of authentication devices storing different pieces of credential information. Thus, the authentication system 1 would be much user friendly. Furthermore, according to the authentication server 500, the authentication system 1 can be provided without adding substantial changes to the existing systems.

Figure 2:
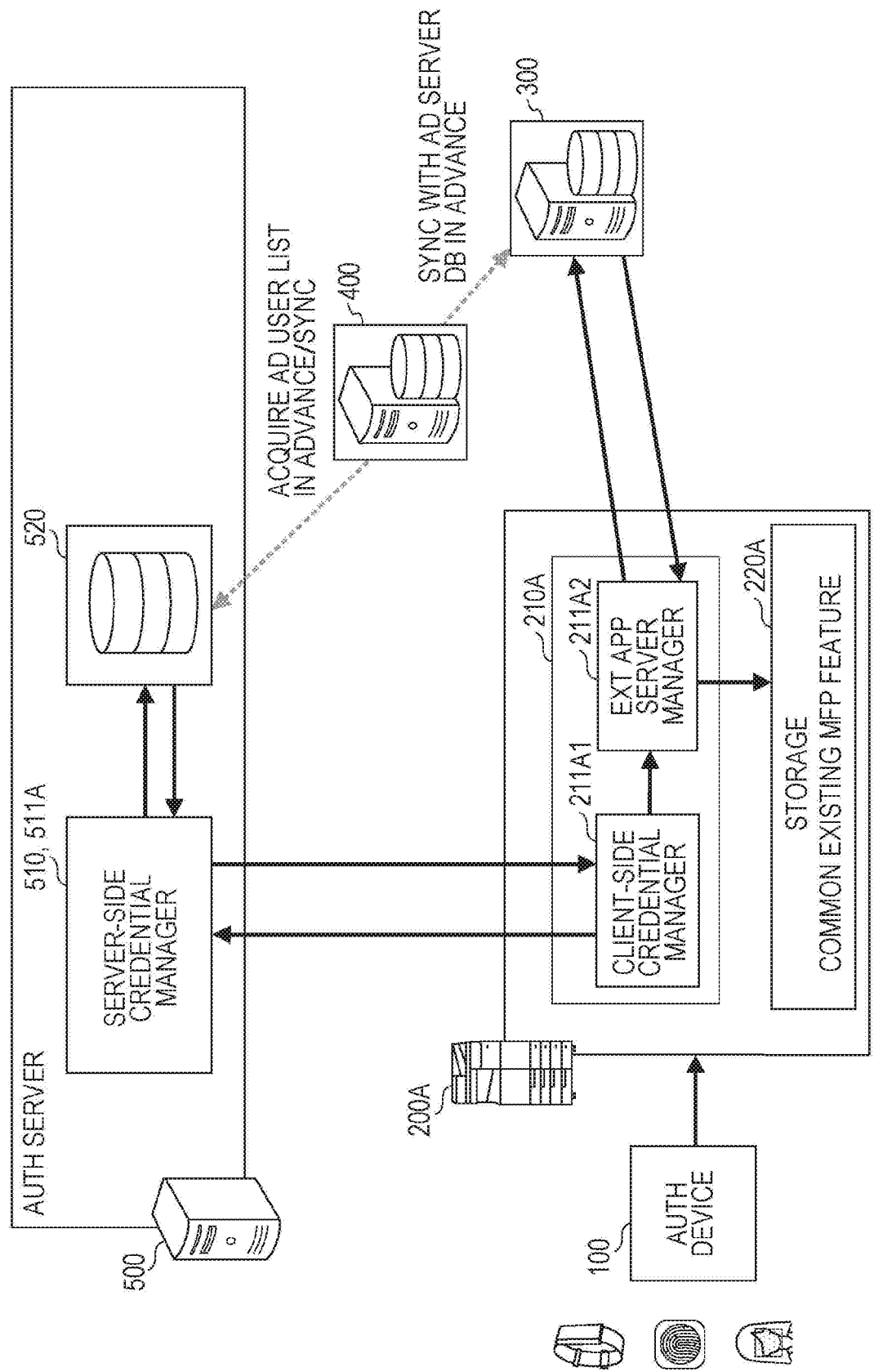
FIG. 2 is a block diagram of the authentication system according to one or more embodiments of the invention.

FIG. 2 is a block diagram of the authentication system 1 adopting the MFP 200A as one of the client devices 200 according to one or more embodiments of the invention. Hereinafter, the authentication system 1 comprising the MFP 200A will be described in detail, while detailed explanations about the authentication system 1 comprising any one of the remaining client devices 200 are omitted because each of the remaining client devices 200 has the similar structure and functions to those of the MFP 200A.

[Authentication Device]

The authentication device 100 is connected to the MFP 200A via a cable or the network, or configured integrally with the MFP 200A.

The authentication device 100 reads, as the piece of user information, a user ID from a wristband worn by the user. In one or more embodiments, a security card that stores a card ID may be used instead of the wristband. Alternatively, the authentication device 100 may detect, as the piece of user information, biological information of the user, such as a finger print, face, iris, and voice. In one or more embodiments, the finger print may be used as the first authenticator, and a PIN number input by the user may be used as the second authenticator. The authentication device 100 then sends the piece of user information to the MFP 200A.

[Client Devices]

The MFP 200A is connected to the authentication server 500 and the external application server 300 via the network.

Figure 3:
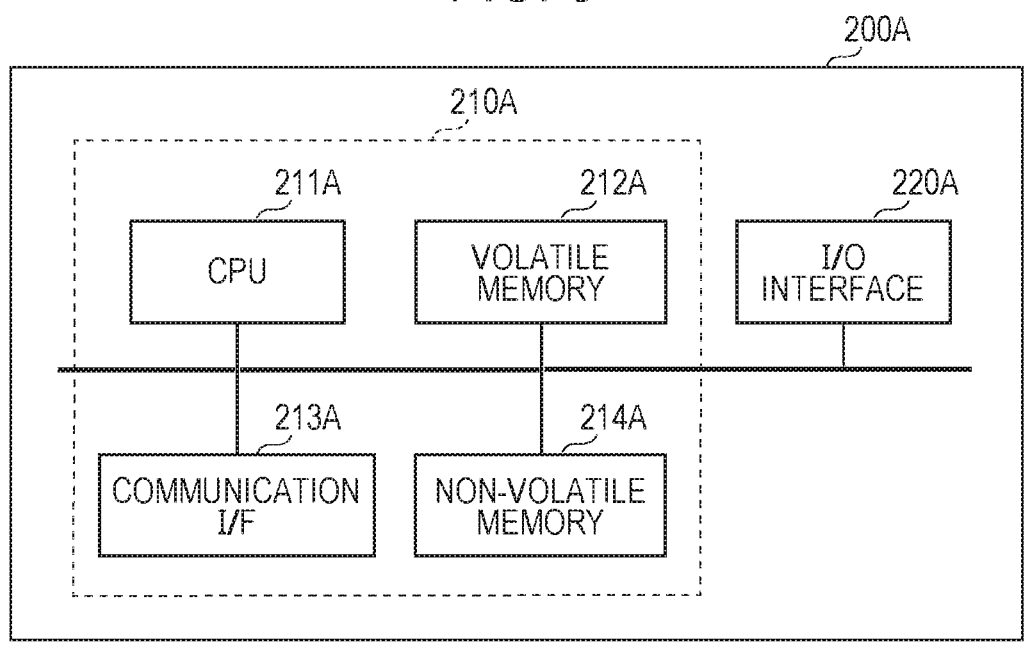
FIG. 3 is a hardware diagram of a client device according to one or more embodiments.

FIG. 3 is a hardware diagram of the MFP 200A according to one or more embodiments. The MFP 200A comprises a processor 210A comprising a central processing unit (CPU) 211A, a volatile memory 212A, a communication interface (IF) 213A, and a non-volatile memory 214A.

The CPU 211A of one or more embodiments functions as a client-side credential manager 211A1 and an external application server manager 211A2, as shown in FIG. 2. The client-side credential manager 211A1 sends the piece of user information to the authentication server 500, and manages the corresponding credential information and/or the pseudo credential information obtained from the authentication server 500. The external application server manager 211A2 sends the authentication request to the external application server 300, and receives the authentication results from the external application server 300. Upon successful authentication, the client-side credential manager 211A1 allows the user to log into the applications/services provided via the MFP 200A, and the MFP 200A can be operated according to the document workflow managed by the external application server 300.

The client-side credential manager 211A1 also sends, to the authentication server 500, necessary credential information that indicates what kind of the credential information is required to log into the applications/services provided by any of the servers (e.g., the external application server 300) via the MFP 200A. The necessary credential information varies depending on user operations in the MFP 200A.

The necessary credential information may be one piece of credential information, or a combination of multiple kinds of pieces of credential information (e.g., user names, passwords, and card IDs), depending on services provided via the client devices 200.

The volatile memory 212A may be random access memory (RAM), cache memory, etc. The communication I/F 213A is connected to the network to communicate with other devices also connected to the network. The non-volatile memory 214A may be read only memory (ROM), flash memory or hard disk, etc.

The volatile memory 212A and/or the non-volatile memory 214A of one or more embodiments store the user information obtained by authentication device 100 or directly obtained by the MFP 200A itself, and the corresponding credential information and/or the pseudo credential information obtained from the authentication server 500.

The MFP 200A further comprises the I/O interface 220A that may include an input device such as a touchscreen, keyboard, mouse, microphone, touchpad, electronic pen, or any other type of input device, and may also include an output device such as a screen (e.g., a liquid crystal display (LCD), a plasma display, touchscreen, cathode ray tube (CRT) monitor, projector, or any other display device), a printer, external storage, or any other output device. One or more of the output devices may be the same or different from the input device.

It is needless to say the MFP 200A may comprise other components that a general Multifunction Peripheral (MFP) comprises. For example, the MFP 200A may comprise an image forming device, a sheet feeding device, a finishing device, and so on.

The same can be said for other client devices 200. For example, the PC 200B and the cell phone 200C may incorporate a camera, a microphone, and a speaker. The security building gate 200D and the security room gate 200E may comprise a card reader that scans an integrated circuit (IC) card, and an image sensor that takes images of visitors.

The IoT device 200F may include variety kinds of devices that connect to the Internet and provide various services to users. In one or more embodiments, the IoT device 200F is a customizing device applicable to vehicles such as cars. For example, the customizing device detects biological information of a driver with a sensor, obtains user attribute information including physical feature information (e.g., a body length) and user preference information from the authentication server 500, and adjusts a seat position of a shared car based on the user attribute information. As another example, the IoT device 200F may be sample testing equipment used in a laboratory or a medical institution. The authentication system 1 may be used for authenticating the user of the sample testing equipment to allow the user to log into a testing workflow system provided by any of the external application servers.

[Authentication Server]

Returning to FIG. 2, the authentication server 500 is connected to the MFP 200A and the AD server 400. The authentication server 500 manages the plurality of pieces of user information and the plurality of pieces of credential information synchronized with those managed by the AD server 400.

Upon receiving the piece of user information from the MFP 200A, the authentication server 500 determines whether the database contains one or more pieces of credential information corresponding to the piece of user information. Upon determining that the database contains the one or more pieces of credential information, the authentication server 500 sends the one or more pieces of credential information to the MFP 200A. Upon determining that the database does not contain the one or more pieces of credential information, the authentication server 500 creates and stores a piece of pseudo credential information in the database and sends the same to the MFP 200A.

Figure 4:
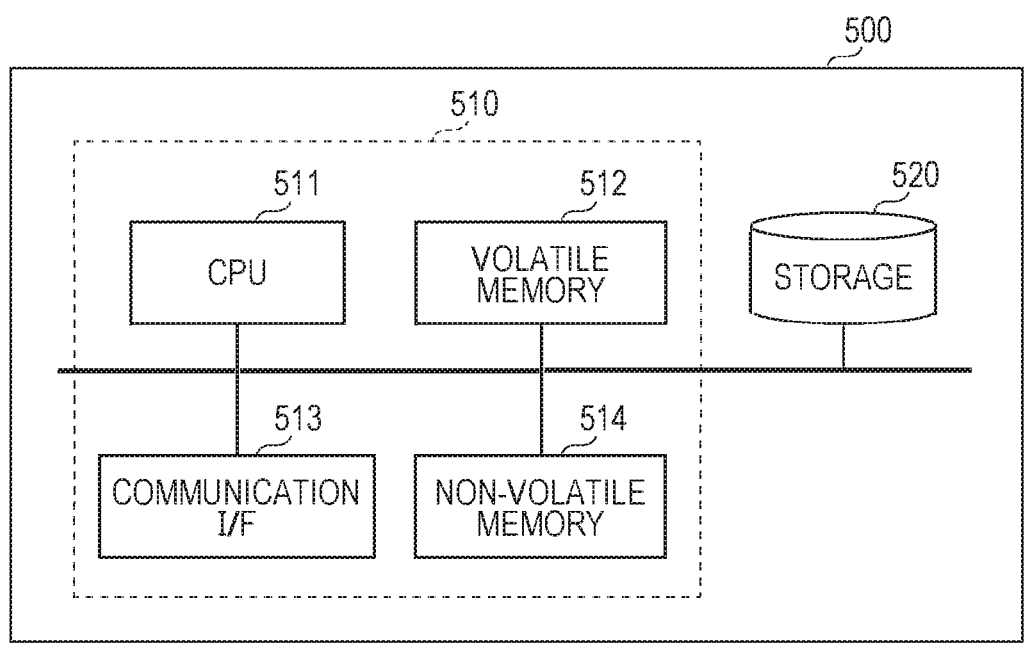
FIG. 4 is a hardware diagram of an authentication server according to one or more embodiments.

FIG. 4 is a hardware diagram of the authentication server 500 according to one or more embodiments. The authentication server 500 comprises a processor 510 comprising a central processing unit (CPU) 511, a volatile memory 512, a communication interface (IF) 513, and a non-volatile memory 514, each of which may have similar configurations to those of the MFP 200A illustrated in FIG. 3.

The CPU 511 of one or more embodiments functions as the server-side credential manager 511A, as shown in FIG. 2. The server-side credential manager 511A searches the database for the one or more pieces of credential information corresponding to the piece of user information.

Upon receiving the necessary credential information from the MFP 200A, the server-side credential manager 511A searches the database for one or more pieces of credential information that coincide with the necessary credential information, using the piece of user information as a search key, to determine whether the database contains the one or more pieces of credential information.

In one or more embodiments, the server-side credential manager 511A previously sets the priority levels for the respective pieces of credential information, and stores the priority levels in the storage 520. The server-side credential manager 511A may select one or more pieces of credential information based on the priority levels, and send the selected one or more pieces of credential information to the MFP 200A. For example, the server-side credential manager 511A may select and send two pieces of credential information to allow the user of the MFP 200A to log in one application provided by one external server and another application provided by another external server. This enables the user to perform an operation requiring the one application and another operation requiring the other application without an operation lag in the MFP 200A.

In the case where the database does not contain the one or more pieces of credential information corresponding to the piece of user information, or in the case where the database does not contain the one or more pieces of credential information that coincide with the necessary credential information, the server-side credential manager 511A creates the piece of pseudo credential information and returns the same to the MFP 200A, in one or more embodiments.

The authentication server 500 further comprises the storage 520, which may be a non-volatile memory such as hard disks or flash memories, etc. The storage 520 of one or more embodiments stores the database that comprises the plurality of pieces of user information, and the plurality of pieces of credential information for logging into the applications/services provided via each of the client devices 200.

In one or more embodiments, the database may comprise multiple kinds of the plurality of pieces of credential information for each of the client devices 200. The processor 510 may send, to the MFP 200A, two or more kinds of the pieces of the credential information corresponding to the piece of user information sent from the MFP 200A.

FIG. 5 is a table showing the database according to one or more embodiments. The database includes items of (i) Authentication ID indicating serial numbers of the users registered in the authentication server 500, (ii) User Property including names, email addresses, divisions that users belong to, locations, and roles of the users, (iii) Account Status including account validities and expiration dates of accounts, (iv) Credential Information such as user names and passwords for logging into applications/services provided by the AD server and the external application servers 1, 2 and Virtual Card IDs as the pseudo credential information for logging into applications/services provided by at least one of these servers, and (v) User Information such as the biological information as the first authenticators and the PIN numbers as the second authenticators.

In one or more embodiments, the database may include the user attribute information including physical feature information (e.g., a body length), user preference information, and so on, though not illustrated. The processor 510 may provide the client devices 200 with the user attribute information in the similar way of providing the credential information to the client devices 200.

[External Application Server]

Figure 6:
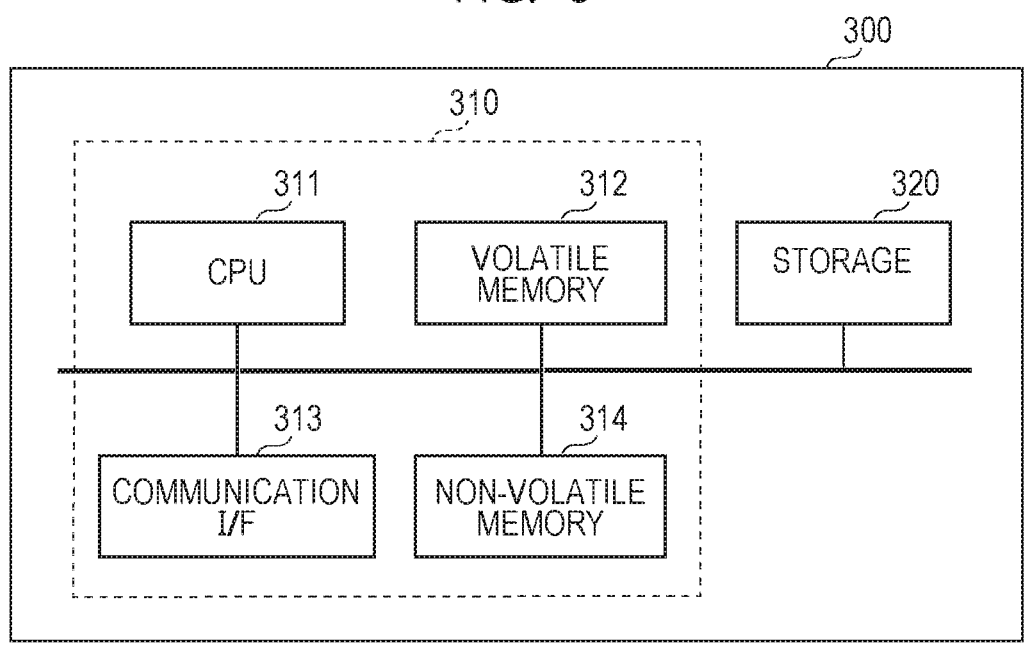
FIG. 6 is a hardware diagram of an external application server according to one or more embodiments.

Returning to FIG. 2, the external application server 300 is connected to the MFP 200A and the AD server 400 via the network. FIG. 6 is a hardware diagram of the external application server 300 according to one or more embodiments. The external application server 300 of one or more embodiments comprises a processor 310 and a storage 320, each of which may have similar configurations to those of the authentication server 500 illustrated in FIG. 4.

The external application server 300 manages the workflows and/or applications for operating the MFP 200A.

The external application server 300 is synchronized with the AD server 400, and stores the plurality of pieces of user information and the plurality of pieces of credential information. The external application server 300 authenticates the user of the MFP 200A using the one or more pieces of credential information or the pseudo credential information sent from the MFP 200A, and informs the MFP 200A of the authentication results.

Specifically, the external application server 300 determines whether the storage 320 contains the one or more pieces of credential information or the pseudo credential information. When determining that the storage 320 contains the one or more pieces of credential information or the pseudo credential information, the external application server 300 determines that the authentication is succeeded, and notifies the authentication success to the MFP 200A. When determining that the storage 320 does not contain the one or more pieces of credential information or the pseudo credential information, the external application server 300 determines that the authentication is failed, and notifies the authentication failure to the MFP 200.

[AD Server]

The AD server 400 is connected to the authentication server 500 and the external application server 300 via the network. The AD server 400 of one or more embodiments comprises a processor and a storage, each of which may have similar configurations to those of the authentication server 500 illustrated in FIG. 4.

The AD server 400 synchronizes with the authentication server 500 and the external application server 300, and provides the servers with part or all of the plurality of pieces of user information and the plurality of pieces of credential information as necessary.

[Initial Authentication Processing]

Figure 7:
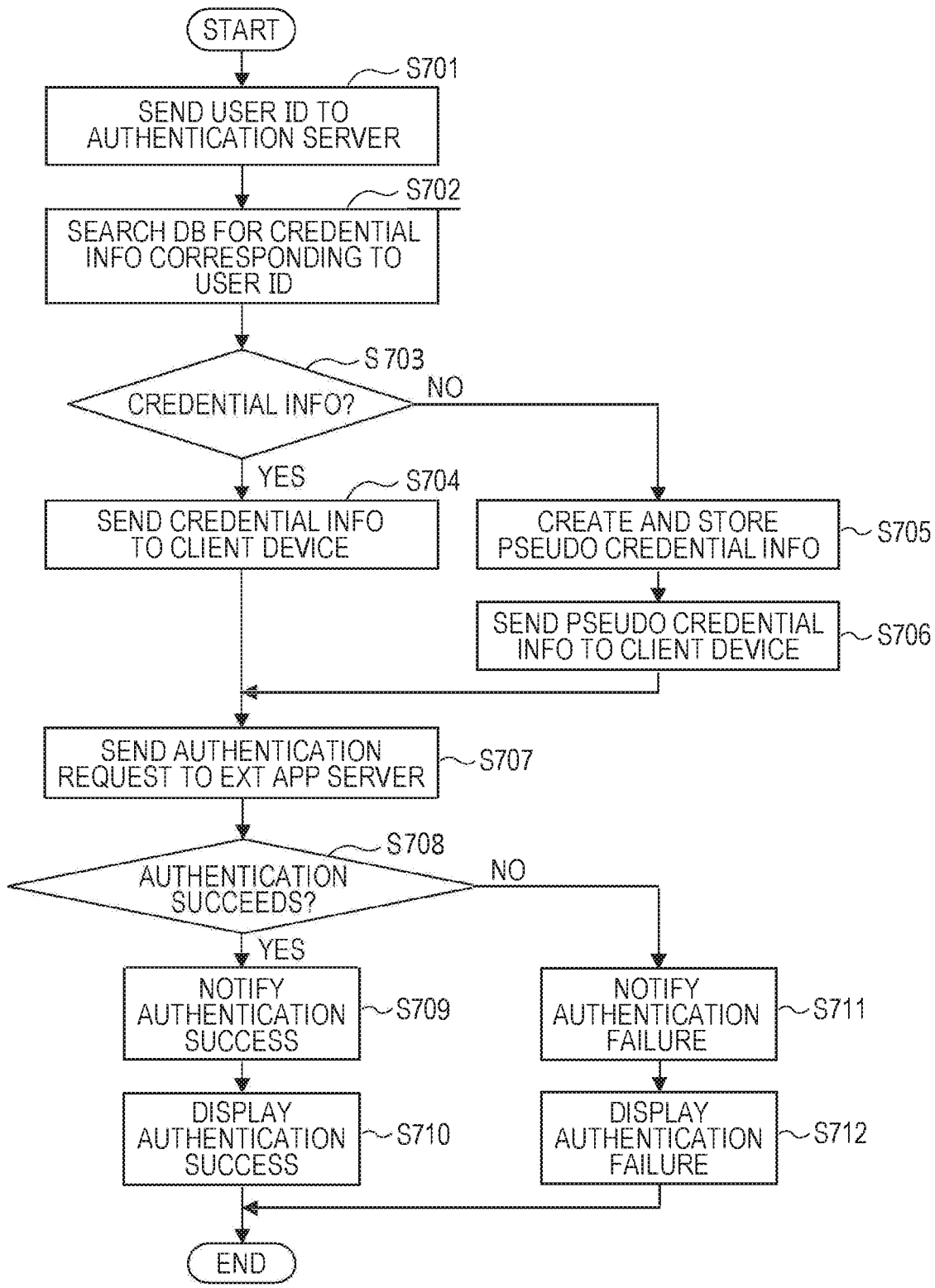
FIG. 7 is a flowchart showing an authentication method according to one or more embodiments.

First, authentication processing when a certain user firstly logs into a desired application or service provided by the external application server 300 via the MFP 200 will be described with reference to the flowchart of FIG. 7. One or more of the steps in FIG. 7 may be performed by the components of the authentication system 1, discussed above in reference to FIG. 1. In one or more embodiments, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7.

When the user brings the wristband close to the authentication device 100, the authentication device 100 reads the user ID from the wristband and sends the same to the MFP 200A. Upon receiving the user ID, the MFP 200A sends the user ID to the authentication server 500 (Step S701). The MFP 200A may also send the necessary credential information together with the user ID, in Step S701.

Upon receiving the user ID from the MFP 200A, the authentication server 500 searches the database for the one or more pieces of credential information corresponding to the user ID (Step S702), and determines whether the database contains the one or more pieces of credential information corresponding to the piece of user information (Step S703). Upon receiving the necessary credential information, the authentication server 500 searches the database for the one or more pieces of credential information that coincide with the necessary credential information using the piece of user information as a search key in Step S702, and determines whether the database contains the one or more pieces of credential information in Step S703.

When determining that the database contains the one or more pieces of credential information corresponding to the piece of user information (Step S703: YES), the authentication server 500 sends the searched credential information to the MFP 200A (Step S704).

When determining that the database does not contain the one or more pieces of credential information corresponding to the piece of user information (Step S703: NO), the authentication server 500 creates the pseudo credential information and stores the same in the database (Step S705). Then, the authentication server 500 sends the created pseudo credential information to the MFP 200A (Step S706).

Upon receiving the corresponding credential information or the pseudo credential information from the authentication server 500, the MFP 200A sends the authentication request, together with the corresponding credential information or the pseudo credential information, to the external application server 300 (Step S707).

Upon receiving the authentication request from the MFP 200A, the external application server 300 performs the authentication using the corresponding credential information or the pseudo credential information (S608).

Once the authentication is succeeded (S608: YES), the external application server 300 notifies the authentication success to the MFP 200A (Step S709), and the MFP 200A displays the authentication success on the I/O interface 220A (Step S710). Once the external application server 300 authenticates the user, the user can log into the applications/services provided by the external application server 300 via the MFP 200. Then the processing is terminated.

Once the authentication is failed (S608: NO), the external application server 300 notifies the authentication failure to the MFP 200A (Step S711), and the MFP 200A displays the authentication failure on the I/O interface 220A (Step S712). Then the processing is terminated.

[Authentication Processing after Pseudo Credential Information is Created]

Figure 8:
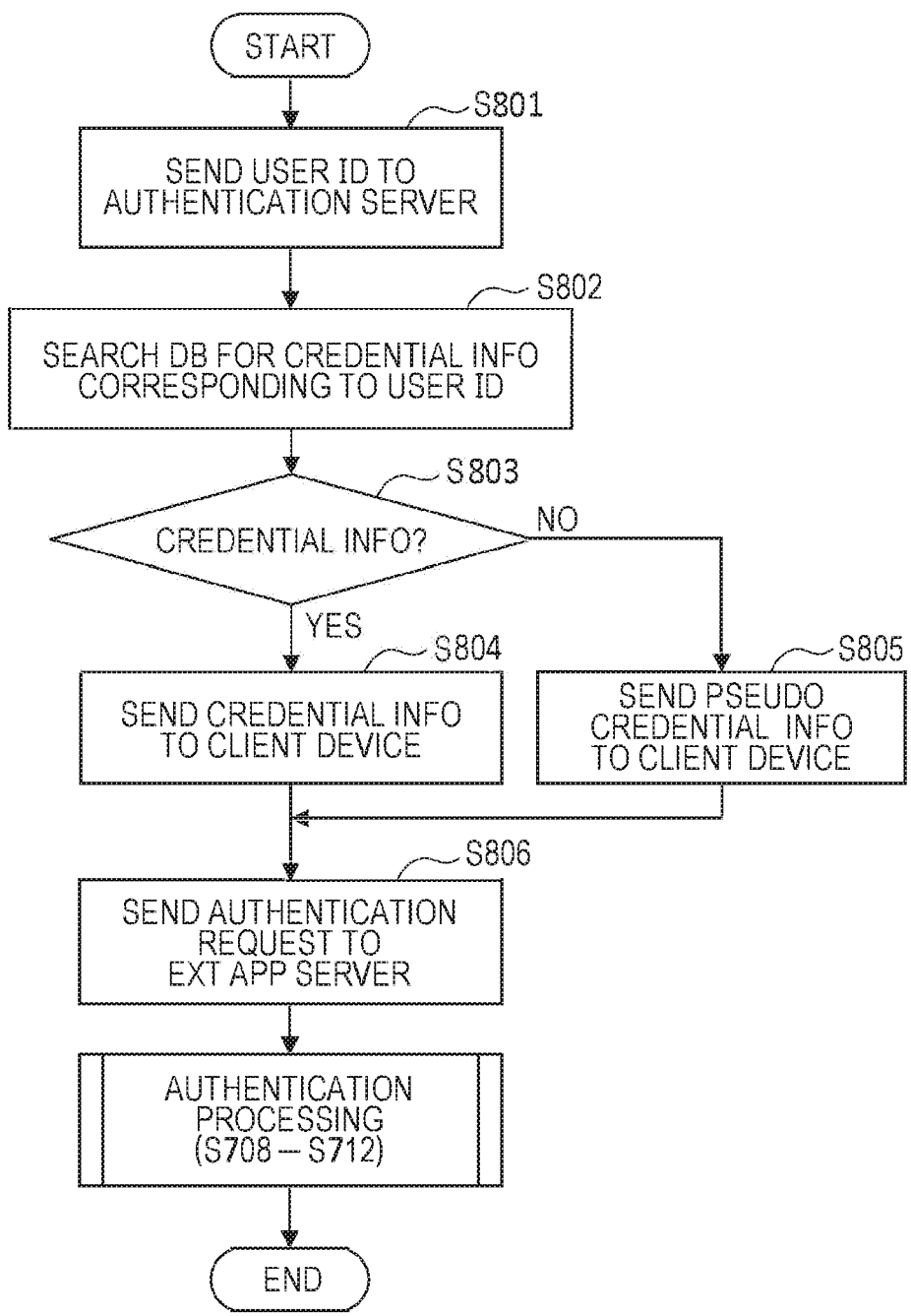
FIG. 8 is a flowchart showing an authentication method according to one or more embodiments.

Next, authentication processing after the pseudo credential information is created will be described with reference to the flowchart of FIG. 8. One or more of the steps in FIG. 8 may be performed by the components of the authentication system 1, discussed above in reference to FIG. 1. In one or more embodiments, one or more of the steps shown in FIG. 8 may be omitted, repeated, and/or performed in a different order than the order shown in FIG. 8. Accordingly, the scope of the invention should not be considered limited to the specific arrangement of steps shown in FIG. 8.

Upon receiving the user ID from the authentication device 100, the MFP 200A sends the user ID to the authentication server 500 (Step S801).

Upon receiving the user ID from the MFP 200A, the authentication server 500 searches the database for the one or more pieces of credential information corresponding to the user ID (Step S802), and determines whether the database contains the corresponding credential information (Step S803).

When determining that the database contains the corresponding credential information (Step S803: YES), the authentication server 500 sends the searched credential information to the MFP 200A (Step S804).

When determining that the database does not contain the corresponding credential information (Step S803: NO), the authentication server 500 searches the database for the pseudo credential information corresponding to the user ID, and sends the same to the MFP 200A (Step S805).

Upon receiving the corresponding credential information or the pseudo credential information from the authentication server 500, the MFP 200A sends the authentication request, with the corresponding credential information or the pseudo credential information, to the external application server 300 (Step S806). After that, the authentication processing of Steps S708-S712 of FIG. 7 is executed. Once the external application server 300 authenticates the user, the user can log into the applications/services provided by the external application server 300 via the MFP 200. Then the processing is terminated.

[Registration Processing of Pseudo Credential Information]

Figure 9:
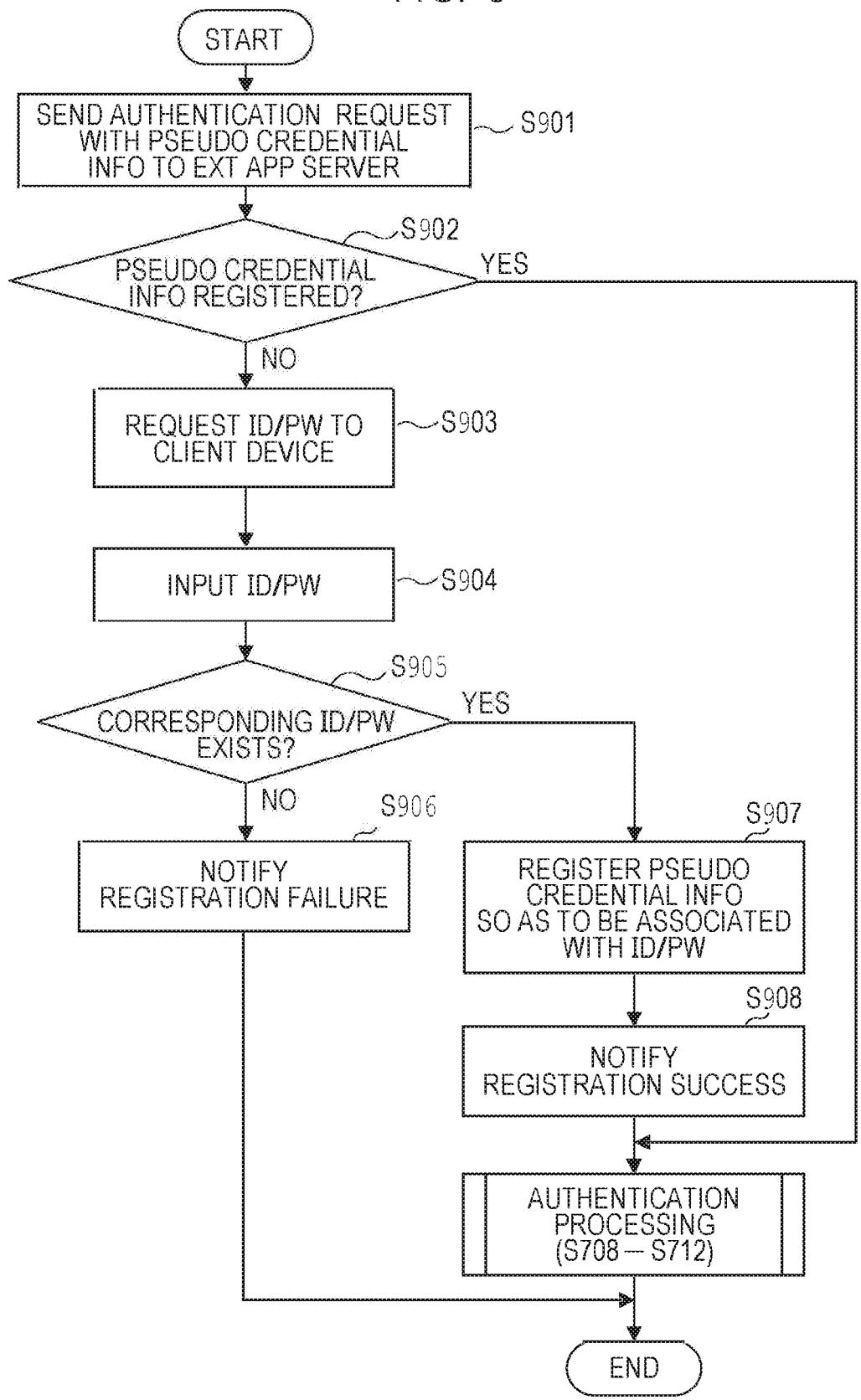
FIG. 9 is a flowchart showing an authentication method according to one or more embodiments.

In the case that the pseudo credential information is created by the authentication server 500 and sent to the external application server 300 for the first time, the external application server 300 needs to register the pseudo credential information so as to be associated with the piece of user information in the storage 320. Here, registration processing of the pseudo credential information will be described with reference to the flowchart of FIG. 9. One or more of the steps in FIG. 9 may be performed by the components of the authentication system 1, discussed above in reference to FIG. 1. In one or more embodiments, one or more of the steps shown in FIG. 9 may be omitted, repeated, and/or performed in a different order than the order shown in FIG. 9. Accordingly, the scope of the invention should not be considered limited to the specific arrangement of steps shown in FIG. 9.

First, the MFP 200A sends the authentication request with the pseudo credential information to the external application server 300 (Step S901).

Upon receiving the pseudo credential information from the MFP 200A, the external application server 300 determines whether the storage 320 already registers the pseudo credential information (Step S902).

When determining that the storage 320 already registers the pseudo credential information (Step S902: YES), the authentication processing of Steps S708-S712 of FIG. 7 is executed using the pseudo credential information.

When determining that the storage 320 does not register the pseudo credential information (Step S902: NO), the external application server 300 requests the MFP 200A to input the user ID and/or password (Step S903).

Upon receiving the request from the external application server 300, the MFP 200A displays an input screen on the I/O interface 220A to urge the user to input the user ID and/or password. Upon receiving the input of the user ID and/or password (Step S904), the MFP 200A sends the same to the external application server 300.

Upon receiving the user ID and/or password, the external application server 300 determines whether the storage 320 stores the corresponding user ID and/or password (Step S905).

When determining that the storage 320 does not store the corresponding user ID and/or password (Step S905: NO), the external application server 300 notifies registration failure to the MFP 200A (Step S906), and the processing is terminated.

When determining that the storage 320 stores the corresponding user ID and/or password (Step S905: YES), the external application server 300 registers the pseudo credential information so as to be associated with the user ID and/or password in the storage 320 (Step S907). The external application server 300 notifies the registration success to the MFP 200A (Step S908). After that, the authentication processing of Steps S708-S712 of FIG. 7 is executed. The registered pseudo credential information may be used to the authentication processing, to allow the user to log into the applications/services provided via the MFP 200A. Then the processing is terminated.

Embodiments of the invention may be implemented on virtually any type of computing system, regardless of the platform being used. For example, the computing system may be one or more mobile devices (e.g. a laptop computer, smart phone, personal digital assistant, tablet computer, or any other mobile device), desktop computers, servers, blades in a server chassis, or any other type of computing device or devices that includes at least the minimum processing power, memory, and input and output devices to perform one or more embodiments of the invention. The computer processors 210A, 310, 510 may be an integrated circuit for processing instructions. For example, the computer processors may be one or more cores, or micro-cores of a processor. Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, a storage device, a diskette, a tape, flash memory, physical memory, or any other computer readable storage medium. Specifically, the software instructions may correspond to a computer readable program code that when executed by a processor(s), is configured to perform embodiments of the invention.

The authentication server and the authentication method of one or more embodiments provide various improvements to authentication technologies. For example, it becomes possible to centrally manage the plurality of pieces of credential information used for different authentication services, without changing existing security systems. By this, users can easily log into applications/services provided via multiple devices managed by different authentication services, and do not need to carry multiple kinds of authentication devices, which store different pieces of credential information, respectively.

Moreover, even when the authentication services adopted by the external application servers are changed, the authentication server and the authentication method of one or more embodiments can easily follow the changed authentication services, namely, can easily handle one or more pieces of credential information applicable for the changed authentication services by newly adding the one or more pieces of credential information in the storage of the authentication server.

Furthermore, because the authentication server of one or more embodiments can provide the client devices with the plurality of pieces of credential information, even when one piece of credential information cannot be used for some reasons, users can use another piece of credential information to log into applications/services provided via the client devices. Examples for the situation where one piece of credential information cannot be used may include a situation where fingerprints cannot be detected because users are wearing gloves.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

The invention claimed is:

1. An authentication system comprising:
an authentication server;
a plurality of client devices including a first client device; and
an external server comprising an external storage, wherein
the authentication server, at least one of the client devices, and the external server are connected to one another via a network,
the authentication server comprises:
an authentication storage that stores a database comprising:
a plurality of pieces of user information; and
multiple kinds of a plurality of pieces of credential information for logging into an application or service provided by the external server via each of the client devices; and
a hardware processor that comprises a central processing unit (CPU) configured to:
upon receiving a first piece of user information from the first client device, determine whether the database contains a first piece of credential information that enables a user to log into the application or service provided via the first client device and that corresponds to the first piece of user information,
upon determining that the database contains the first piece of credential information, send the first piece of credential information to the first client device, and
upon determining that the database does not contain the first piece of credential information, create and store a first piece of pseudo credential information in the database, and send the first piece of pseudo credential information to the first client device, wherein the first piece of pseudo credential information indicates the application or service provided by the external server and enables the user to log into the application or service provided via the first client device,
the first client device transmits an authentication request with the first piece of credential information or the first piece of pseudo credential information to the external server,
the external server is configured to:
upon determining that the external storage contains either one of the first piece of credential information and the first piece of pseudo credential information, authenticate the user of the first client device,
upon determining that the external storage does not contain the first piece of pseudo credential information, request the first client device to input a password or a user ID of the user, and
upon receiving the password or the user ID from the first client device, register the pseudo credential information so as to be associated with the password or the user ID in the storage, and
after creating and storing the first piece of pseudo credential information, and upon determining that the database does not contain the first piece of credential information, the hardware processor searches the database for the first piece of pseudo credential information using the first piece of user information.

2. The authentication system according to claim 1, wherein
the multiple kinds of the plurality of pieces of credential information include a password, a user ID, certificate information, and pseudo credential information.

3. The authentication system according to claim 1, wherein
the authentication storage further stores a priority level for each of the first pieces of credential information, and
the hardware processor selects one or more of the first pieces of credential information based on the priority level, and sends the selected one or more of the first pieces of credential information to the first client device.

4. The authentication system according to claim 1, wherein
upon receiving necessary credential information from the first client device, the hardware processor searches the database for the first piece of credential information that coincides with the necessary credential information using the first piece of user information as a search key to determine whether the database contains the first piece of credential information.

5. The authentication system according to claim 1, wherein
the authentication storage further stores user attribute information that includes physical feature information and user preference information, and
the hardware processor sends, to the first client device, the user attribute information that corresponds to the first piece of user information.

6. The authentication system according to claim 1, wherein
the client devices include at least one of a security door, a Multifunction Peripheral (MFP), a cellular phone, a personal computer (PC), and Internet of Things (IoT) device.

7. An authentication method using an authentication server that is connected to a plurality of client devices via a network, and comprises an authentication storage and a processor, the method comprising:
storing, in the authentication storage, a database comprising:
a plurality of pieces of user information; and
multiple kinds of a plurality of pieces of credential information for logging into an application or service provided by an external server via each of the client devices;
upon the processor receiving a first piece of user information from a first client device, determining, by the processor, whether the database contains a first piece of credential information that enables a user to log into the application or service provided via the first client device and that corresponds to the first piece of user information;
upon the processor determining that the database contains the first piece of credential information, sending, by the processor, the first piece of credential information to the first client device;
upon the processor determining that the database does not contain the first piece of credential information, creating and storing, by the processor, a first piece of pseudo credential information in the database, and sending the first piece of pseudo credential information to the first client device, wherein first piece of the pseudo credential information indicates the application or service provided by the external server and enables the user to log into the application or service provided via the first client device;
transmitting, by the first client device, an authentication request with the first piece of credential information or the first piece of pseudo credential information to the external server;
upon the external server determining that an external storage of the external server contains either one of the first piece of credential information and the first piece of pseudo credential information, authenticating, by the external server, the user of the first client device;
upon the external server determining that the external storage does not contain the first piece of pseudo credential information, requesting, by the external server, the first client device to input a password or a user ID of the user; and
upon the external server receiving the password or the user ID from the first client device, registering, by the external server, the pseudo credential information so as to be associated with the password or the user ID in the storage; and
after creating and storing the first piece of pseudo credential information, and upon determining that the database does not contain the first piece of credential information, searching, by the hardware processor, the database for the first piece of pseudo credential information using the first piece of user information.

8. The authentication method according to claim 7, wherein
the multiple kinds of the plurality of pieces of credential information include a password, a user ID, certificate information, and pseudo credential information.

9. The authentication method according to claim 7, further comprising:
further storing, in the authentication storage, a priority level for each of the first pieces of credential information, and
selecting, by the processor, one or more of the first pieces of credential information based on the priority level, and sends the selected one or more of the first pieces of credential information to the first client device.

10. The authentication method according to claim 7, further comprising:
upon the processor receiving necessary credential information from the first client device, searching, by the processor, the database for the first piece of credential information that coincides with the necessary credential information using the first piece of user information as a search key to determine whether the database contains the first piece of credential information.

11. The authentication method according to claim 7, further comprising:
further storing, in the authentication storage, user attribute information that includes physical feature information and user preference information, and
sending, to the first client device by the processor, the user attribute information that corresponds to the first piece of user information.

12. The authentication method according to claim 7, wherein
the client devices include at least one of a security door, a Multifunction Peripheral (MFP), a cellular phone, a personal computer (PC), and Internet of Things (IoT) device.

13. A non-transitory computer readable medium (CRM) storing computer readable program code that is executed by a computer as an authentication server being connected to a plurality of client devices and comprising an authentication storage and a processor, and causes the computer to execute:
storing, in the authentication storage, a database comprising:
a plurality of pieces of user information; and
multiple kinds of a plurality of pieces of credential information for logging into an application or service provided by an external server via each of the client devices;
upon the processor receiving a first piece of user information from a first client device, determining, by the processor, whether the database contains a first piece of credential information that enables a user to log into the application or service provided via the first client device and that corresponds to the first piece of user information;
upon the processor determining that the database contains the first piece of credential information, sending, by the processor, the first piece of credential information to the first client device;
upon the processor determining that the database does not contain the first piece of credential information, creating and storing, by the processor, a first piece of pseudo credential information in the database, and sending the first piece of pseudo credential information to the first client device, wherein the first piece of pseudo credential information indicates the application or service provided by the external server and enables the user to log into the application or service provided via the first client device;
transmitting, by the first client device, an authentication request with the first piece of credential information or the first piece of pseudo credential information to the external server;
upon the external server determining that an external storage of the external server contains either one of the first piece of credential information and the first piece of pseudo credential information, authenticating, by the external server, the user of the first client device;
upon the external server determining that the external storage does not contain the first piece of pseudo credential information, requesting, by the external server, the first client device to input a password or a user ID of the user; and
upon the external server receiving the password or the user ID from the first client device, registering, by the external server, the pseudo credential information so as to be associated with the password or the user ID in the storage; and
after creating and storing the first piece of pseudo credential information, and upon determining that the database does not contain the first piece of credential information, searching, by the hardware processor, the database for the first piece of pseudo credential information using the first piece of user information.

* * * * *